No. 798,798. PATENTED SEPT. 5, 1905.
J. A. JOHNSON.
MOLD FOR FORMING BUILDING BLOCKS.
APPLICATION FILED MAR. 16, 1905.
2 SHEETS—SHEET 1.
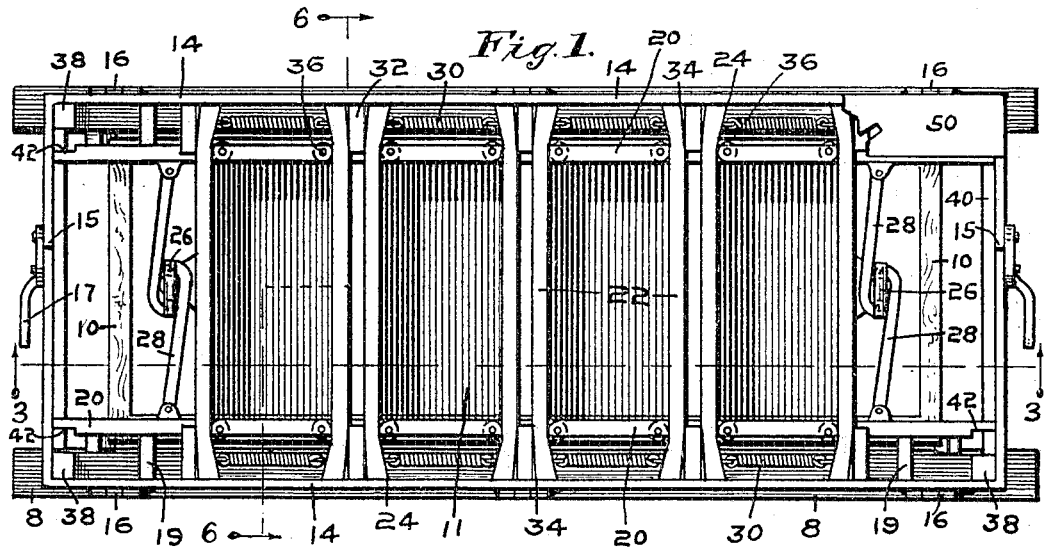
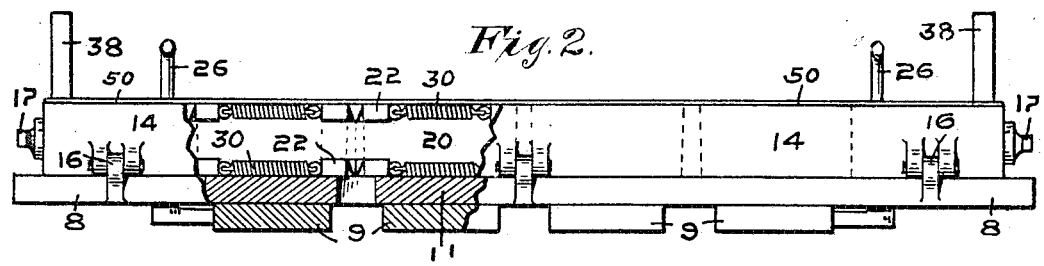
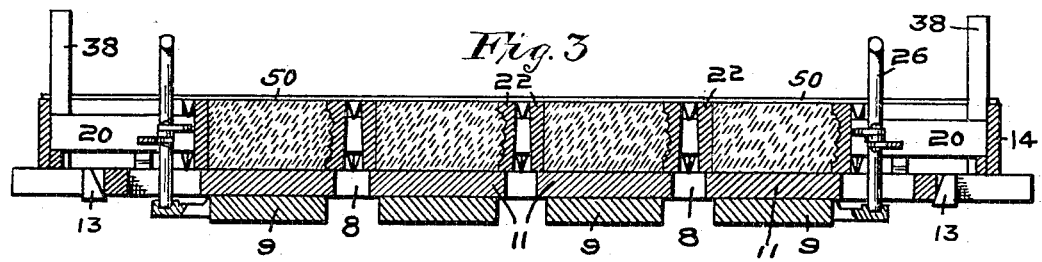
WITNESSES:
L. B. Hoerner.
Wm Hurte.
INVENTOR.
JOHN A. JOHNSON,
By Minturn & Worner,
ATTORNEYS.

No. 798,798. PATENTED SEPT. 5, 1905.
J. A. JOHNSON.
MOLD FOR FORMING BUILDING BLOCKS.
APPLICATION FILED MAR. 16, 1905.
2 SHEETS—SHEET 2.
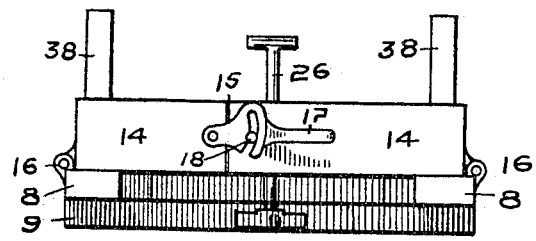
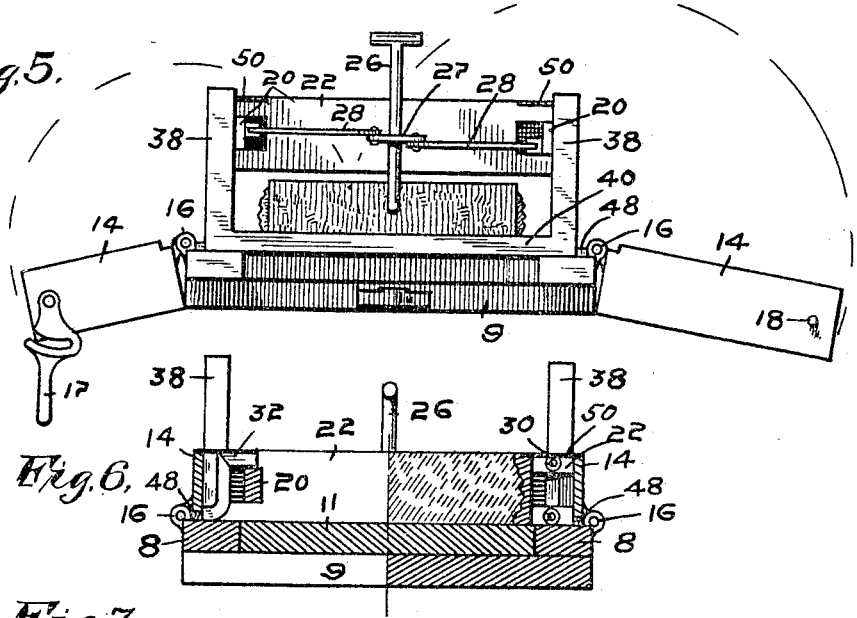
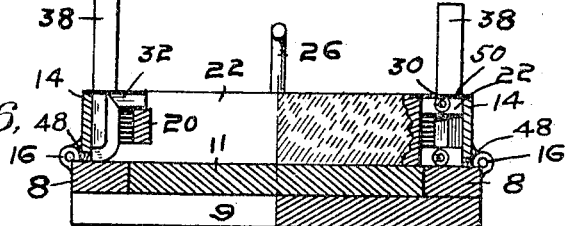
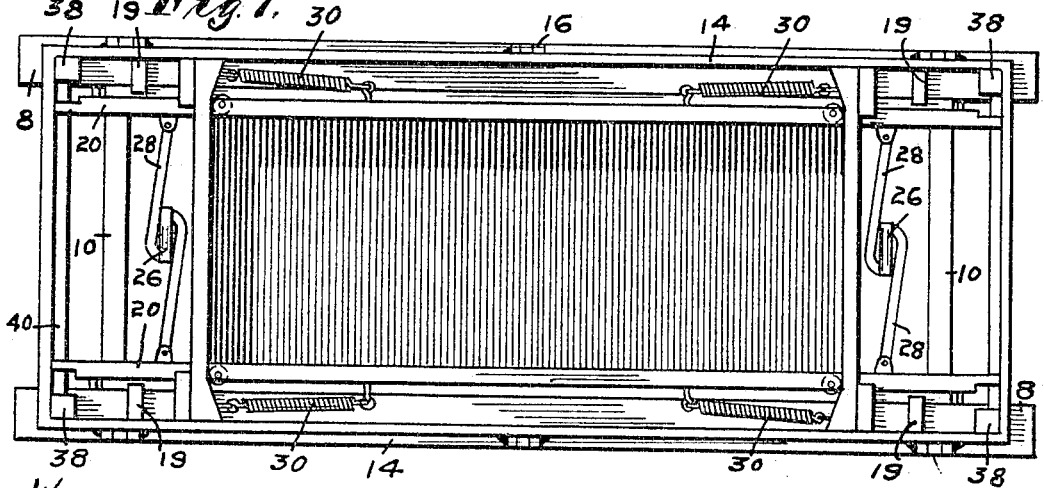
WITNESSES:
L. B. Koerner
Wm Hurte.
INVENTOR:
JOHN A. JOHNSON,
By Minturn & Woerner,
ATTORNEYS.

UNITED STATES PATENT OFFICE.

JOHN A. JOHNSON, OF WINAMAC, INDIANA.

MOLD FOR FORMING BUILDING-BLOCKS.

No. 798,798.  Specification of Letters Patent.  Patented Sept. 5, 1905.

Application filed March 16, 1905. Serial No. 250,456.

*To all whom it may concern:*

Be it known that I, JOHN A. JOHNSON, a citizen of the United States, residing at Winamac, in the county of Pulaski and State of Indiana, have invented certain new and useful Improvements in Molds for Forming Building-Blocks, of which the following is a specification.

This invention relates to improvements in molds for forming concrete bricks, building-blocks, and the like; and the object of the invention is to provide means whereby the sides and ends of the molds can be simultaneously removed in directions at right angles to the finished faces of the product in order thereby to prevent damage to the green and unset cement.

The further object is to provide means for bringing the several parts of the mold together into proper operative position previous to the molding operation and for securely locking them in position during the molding operation; and the further object, after the sides and ends have been removed from the product, is to provide means for a complete and ready removal of said sides and ends of the mold, thereby leaving the product on the pallet in position to be removed with the pallet without danger of injury from any of the parts of the said mold.

The object of the invention also is to provide a mold which can be operated rapidly by workmen of little or no experience and which will be cheap to construct and inexpensive to maintain.

I accomplish the objects of the invention by the mechanism illustrated in the accompanying drawings, in which—

Figure 1 is a top plan view of an empty mold embodying all the features of my invention, the mold being in closed position ready to receive the concrete. Fig. 2 is a side elevation of same with parts broken away to show the interior construction. Fig. 3 is a longitudinal vertical section on the line 3 3 of Fig. 1. Fig. 4 is an end view of mold shown in Fig. 1. Fig. 5 is a view of the same end with the hinged members of the outside frame in open position and showing the mold proper in elevated position above the top of the article just molded. Fig. 6 is a vertical section on the line 6 6 of Fig. 1, and Fig. 7 is a top plan view of a modified mold in which a single large block instead of a plurality of bricks will be made.

Like characters of reference indicate like parts throughout the several views of the drawings.

8 8 are parallel members which are united by the transverse pieces 9, located below the members 8, which pieces with said members form the base or body of my device. Located between the members 8 and resting upon and supported by the parts 9 is the wooden pallet upon which the concrete article will be formed. By the removal of the pallet from the mold the concrete product will also be removed. The pallet comprises a rectangular frame, the sides of which make a close fit between the members 8 of the body of the device and the ends 10, which strengthen and unite the sides and serve also as handles for the removal of the pallet. The side members of the pallet form the supports for the boards 11. Each one of these boards 11 forms a mold-base, and each mold-base overlies one of the pieces 9 above mentioned. The boards 11 are separated from each other by an open space for the passage of such concrete material as may overflow from the molds during the molding operation. Projecting inwardly from the members 8 are the blocks 13 with oblique faces, as shown in Fig. 3, for the purpose of guiding the pallet into operative position. This is important for the reason that in rapid work there is not time in which to carefully adjust the pallet, which is changed between each molding operation.

14 is a two-part frame, the purpose of which is to locate and securely hold the sides and ends of the mold in proper operative position. This frame is divided at its end at 15, and the two parts thus produced are secured, by means of the hinges 16, to their respective opposite members 8 of the base in the manner as clearly shown in the drawings, and the two parts, as shown in Fig. 5, are capable of being opened out to facilitate the removal of the sides and ends of the mold and afterward of the pallet and product on said pallet. A lever 17 (see Fig. 4) is pivotally secured to one member of said two-part frame. This lever has a slot which is eccentric to the pivot, and the slot is made to engage a pin 18 on the opposite member, whereby by lowering the lever the two parts of the frame will be drawn together and locked. The frame 14 will have the feet 19, which will overlap the frame of the pallet and press the latter down into level position. This is important for the reason that as the pallet is made out of wood it is apt to warp and be uneven unless positively held. The same ends of all of the molds are joined together into the continuous bars 20, which extend from end to end of said frame 14.

Figs. 1 to 6 of the drawings represent a device having compartments for molding four bricks at a time, and it is obvious that a greater or a less number can be used without departing from the spirit of this invention. 22 represent the sides of these four molds. Each of these sides will consist of a separate plate, the ends of which are centrally notched for the passage therethrough of the bars 20, and the bars 20 to avoid conflict with the remaining parts of sides 22 will be reduced in thickness so as to enter the notches in the ends of said sides. When the sides 22 are pressed into close contact with the shoulders formed on the bars 20 and the bars 20 are resting against the bottoms of the notches in the sides 22, the mold is in its closed position ready to be filled with the concrete or other plastic material. When in this closed or operative position, the sides 22 of the adjacent molds are separated from each other by an open space which serves the double purpose, first, of allowing the sides to move laterally in the expanding or opening of the mold, and, second, allows any overflow of the concrete to drop through out of the way. In order to keep this concrete overflow from lodging between the sides 22, the outside walls of the latter will be made oblique to provide a space between the adjacent walls that will increase downwardly, as shown in Fig. 3.

The narrow strips or tongues formed by the notches in sides 22 will have wedges 24 for the purpose of spreading said sides 22 when the bars 20 are spread or moved in opposition to each other. For the purpose of spreading the bars 20, I provide the vertical shaft 26 at each end of the mold series, which shafts have opposite lateral ears or crank extensions 27, (see Fig. 5,) and these ears are connected, by means of the link-bars 28, with said bars 20, whereby by the rocking of shaft 26 the link-bars 28 will be brought into line, thereby spreading the bars 20, or by a reverse movement drawing the bars 20 together. It will thus be seen that when the sides and ends of the molds are in their normal or operative closed positions they can be separated simultaneously in all four directions by a proper movement of the shaft 26. The lower end of the shaft 26 is loosely seated in a socket supported by a bracket extension from the pieces 9 of the base. In order to cause the parts of the mold to assume their closed or contracted relations automatically, I connect the opposite ends of the two side pieces of each mold by means of the spiral springs 30, the normal action of which is to draw the parts connected by them toward each other, and under their action the wedges on the sides 22 will cause the bars 20 to move inwardly of the mold. A more positive assembling of said sides and ends and a secure locking of them in their assembled positions will be secured by means of the extensions 32 from the frame 14. The inner edges of these extensions are made wedge shape, and they are so placed as to enter the spaces between the sides of each adjacent pair of molds, so that when the molds have been set and the frame-section 14 is closed around them the wedges 32, carried by said frame, will crowd the sides 22 firmly into their closed positions. To facilitate the entrance of the wedges, the contacting ends of sides 22 will be beveled, as shown at 34. In order to reduce the friction between the wedges 24 and the shoulders of the bars 20, I will provide the rollers 36.

Mounted on the base-pieces 8 inside the frame 14 at the corners of the latter are the posts 38, and the pair of posts at each end of frame 14 are connected by the bar 40, upon which the reduced ends of the bars 20 will rest when the molds are assembled in position to be filled. These ends of the bars 20 have outside notches 42. After the molds are filled and before the frame 14 is opened the bars 20 are spread by rocking the shaft 26 in the manner as previously described, which forces the bars apart and into contact with post 38, with the posts entering the notches 42 of bars 20. Then the frame is unlocked and thrown open on its hinges and the sides and ends of the mold which have been spread apart so as to clear the newly-formed concrete are drawn upward by the workmen in charge, and contact with the product is prevented by the posts 38, which act as guides in the elevation of said open sides and ends. When the height of the newly-formed blocks has been reached, the sides and ends will be lifted off as a whole, thus leaving the pallet unobstructed for free removal with the newly-molded blocks. An unfilled pallet will be introduced into the device, and thereupon the sides and ends just removed will be returned and the frame 14 closed and locked around the parts in the manner as shown and heretofore described. The proper locating of the sides 22 will be assisted by means of the longitudinal cleats 48, (see Figs. 5 and 6,) which are attached to the members 8 of the base and project up to form stops or guides for sides 22.

Where it is desired to mold larger blocks than those of brick size, a construction similar to that shown in Fig. 7, which is a modification of my device, will be employed. The spaces between the bar 20 and frame 14 are covered with sheet metal 50 for the purpose of keeping the concrete from dropping therein. In the operation of molding the several molds are first filled with the concrete material and tamped and then refilled and tamped, and this operation is repeated until the molding is complete. In filling the molds it is the practice to fill them heaping full and scrape off the surplus by passing a V-shaped scraper along the sheet-metal coverings over the ends of the molds above referred to.

Having thus fully described my invention, what I claim as new, and wish to secure by Letters Patent of the United States, is—

1. In a device for forming building-blocks, a frame in a plurality of separable parts, means for securely uniting said parts, a pallet, molds having sides and ends resting upon said pallet, said sides and ends being laterally movable, means for simultaneously separating the opposite members of said sides and ends and springs for returning them to a normal closed position.

2. In a mold for forming building-blocks, a removable pallet, mold ends and mold sides mounted loosely on said pallet, two of the opposite of said side or end members having shoulders or projections and the remaining two of said members having oblique surfaces to contact with the shoulders or projections on the two first members, means for oppositely moving and thereby separating the two first members whereby the other two members will be simultaneously and oppositely separated and spiral springs connecting one of said members with its opposite coöperating member.

3. In a mold for forming building-blocks, a removable pallet, mold ends and mold sides mounted loosely on said pallet, two of the opposite of said side or end members having shoulders or projections and the remaining two of said members having oppositely-sloped oblique surfaces to contact with the shoulders or projections on the two first members, and means for oppositely moving and thereby separating the two first members whereby the other two members will be simultaneously and oppositely separated, and elastic ties to normally move the members with the oblique faces toward each other.

4. In a device for forming concrete blocks, a base comprising side pieces and transverse connecting-pieces extending under said side pieces, a pallet removably located on said cross-pieces between the side pieces, a two-part frame having the parts hinged to the opposing members of said base, means for fastening the two parts of the frame together, molds having movable ends and sides, said ends and sides being located within said frame, the sides having oblique surfaces next to the mold of which it is a part, and the ends having shoulders to contact with the oblique surfaces of the sides and separate said sides by an outward movement of the end pieces, and automatic means for restoring the sides and ends to their molding positions when the separating strain is removed.

5. In a device for forming building-blocks, a base, a pallet removably placed thereon, a frame in two parts each of which is hinged to said base, mold sides and ends in oppositely-separable parts, means for simultaneously separating said parts and wedges carried by the frame-sections for locking the closed members of the molds.

6. In a device for making building-blocks, a base comprising side members which are united by underlying cross-pieces, the side members having inward projections adjacent to their ends with oblique inner faces, a pallet fitting between the side members and directed into position by the oblique surfaces of said projections from the base, adjustable mold ends and sides resting upon said pallet, and means for spreading the last-named parts for the removal of the product of the mold.

7. In a device for forming building-blocks, a base, a pallet mounted thereon, a two-part frame having said parts hinged to the base, mold ends and sides having cut-away portions to permit said parts to cross each other, means for simultaneously spreading the sides and ends and for uniting said sides and ends so they may be removed as a whole, posts mounted on the base and extending above the tops of the molded product on the pallet, the end bars of said molds having notched extensions to contact with said posts when the molds are spread, whereby said posts will serve as guides to prevent injury to the product by said sides and ends during the removal of the latter.

8. A base comprising side members connected by underlying cross-pieces, said side members having inward extensions with oblique faces, a pallet located between said side members on the cross-pieces and directed by said extensions, a frame in two parts said parts being hinged to opposite side members of the base, means for fastening the two members together, a pair of bars parallel with each other extending from end to end within the frame and forming the ends of a plurality of molds, sides for said molds located within the frame and extending from side to side thereof, said sides having middle end notches to receive portions of the end bars which are reduced in width to enter said end notches, the projections of said sides having inner wedges to spread the sides by an outward movement of the end bars, springs to draw the sides of each mold together, wedges carried by the frame-sections to enter between the sides of adjacent molds and close the molds, means to spread the end bars and posts to limit the spread of said bars and serve as guides to control the withdrawal of the end bars and mold sides on the removal of the latter, said posts extending above the molded product to prevent injury thereto.

9. In a mold for forming building-blocks, a base, a pallet located upon the base, a frame surrounding the pallet, mold sides extending from one side of the frame to the other within the frame, bars forming mold ends and extending from one end of the mold to the other within the frame remote from the ends of the mold sides, and sheet-metal plates covering the spaces between the end bars of the mold and the sides of the frame.

10. In a device for making concrete blocks, a base, a pallet removably supported thereon, said pallet having a plurality of transverse openings, a plurality of molds located on said pallet, said molds being separated by spaces which register with the transverse openings in the pallet, laterally-adjustable sides and ends for said molds, the outer surfaces of said sides being oblique to form spaces between said molds which increase in width downwardly.

11. In a mold for forming concrete blocks, a base, a removable pallet located thereon, a two-part frame having said parts hinged to opposite sides of the said base, means for drawing the parts of the frame together and fastening them, a pair of transverse bars located within the frame and extending from end to end thereof and forming the ends of a plurality of molds, mold sides located within the frame transversly and extending from side to side of the frame, said sides having middle notches to receive reduced portions of the end bars and providing extensions of said sides beyond the bars, wedge faces on said extensions to contact with the shoulders on the bars formed by said reductions in width of the latter, friction-rollers mounted in said shoulders to contact with the wedges, springs to draw the two sides of each mold together, a rock-shaft having lateral ears, link-bars connecting said ears with said bars forming the ends of the molds whereby the rocking of the rock-shaft will spread the end bars and open the mold.

In witness whereof I have hereunto set my hand and seal, at Indianapolis, Indiana, this 28th day of February, A. D. 1905.

JOHN A. JOHNSON. [L. S.]

Witnesses:
F. W. WOERNER,
JOS. A. MINTURN.